United States Patent
Tokura et al.

(10) Patent No.: US 12,468,040 B2
(45) Date of Patent: Nov. 11, 2025

(54) MOVABLE OBJECT, DISTANCE MEASUREMENT METHOD, AND DISTANCE MEASUREMENT PROGRAM

(71) Applicant: KABUSHIKI KAISHA TOSHIBA, Tokyo (JP)

(72) Inventors: Seiji Tokura, Kawasaki Kanagawa (JP); Daisuke Yamamoto, Kawasaki Kanagawa (JP); Takafumi Sonoura, Yokohama Kanagawa (JP); Junya Tanaka, Ota Tokyo (JP); Hideki Ogawa, Shinagawa Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 640 days.

(21) Appl. No.: 17/183,234

(22) Filed: Feb. 23, 2021

(65) Prior Publication Data
US 2021/0373169 A1    Dec. 2, 2021

(30) Foreign Application Priority Data
May 29, 2020 (JP) ................................. 2020-095052

(51) Int. Cl.
*G01S 17/931* (2020.01)
*G01C 9/02* (2006.01)
*G01S 17/89* (2020.01)

(52) U.S. Cl.
CPC .............. *G01S 17/931* (2020.01); *G01C 9/02* (2013.01); *G01S 17/89* (2013.01)

(58) Field of Classification Search
CPC ...... G01S 17/931; G01S 17/89; G01S 7/4972; G01S 17/42; G01S 7/4817; G01C 9/02; A47L 9/2826; A47L 2201/04
(Continued)

(56) References Cited

U.S. PATENT DOCUMENTS

2007/0025112 A1* 2/2007 Kuhl ................... B60Q 1/10
2015/0151741 A1* 6/2015 Taira .................. G05D 1/0242
(Continued)

FOREIGN PATENT DOCUMENTS

| JP | 2010-134742 A | 6/2010 |
| JP | 2018-5709 | 1/2018 |
| WO | WO 2019/176278 A1 | 9/2019 |

OTHER PUBLICATIONS

Machine Translation of JP-20210-134742A1 (Takashi); Movement Control Device Having Obstacle Avoiding Function; Jun. 17, 2010. (Year: 2010).*

*Primary Examiner* — Truc M Do
*Assistant Examiner* — Ellis B. Ramirez
(74) *Attorney, Agent, or Firm* — Finnegan, Henderson, Farabow, Garrett & Dunner, LLP (57) ABSTRACT

A movable object includes: a vehicle body; a distance measurement part configured to measure a distance to a physical object; an orientation measurement part configured to measure an orientation angle of the vehicle body; and a control device connected to the distance measurement part and the orientation measurement part. The control device acquires a measurement value of a detection range from the distance measurement part, calculates a valid range of the detection range on the basis of the orientation angle acquired from the orientation measurement part, and invalidates the measurement value of an invalid range not included in the valid range.

20 Claims, 9 Drawing Sheets

(58) Field of Classification Search
USPC ....... 701/23, 514, 519; 73/1.79; 356/3, 4.06; 382/106
See application file for complete search history.

(56) References Cited

U.S. PATENT DOCUMENTS

| | | | |
|---|---|---|---|
| 2016/0110932 A1* | 4/2016 | Klein | B60W 50/0205 |
| 2017/0028986 A1 | 2/2017 | Kuroda | |
| 2020/0041272 A1* | 2/2020 | Chae | G05B 19/406 |
| 2020/0132846 A1* | 4/2020 | Nakamura | G01S 7/493 |
| 2020/0150235 A1* | 5/2020 | Beijbom | G01S 7/4808 |
| 2020/0150248 A1 | 5/2020 | Jung | |
| 2020/0201351 A1* | 6/2020 | Armstrong-Crews | G05D 1/0248 |
| 2020/0275033 A1* | 8/2020 | Petniunas | H04N 13/246 |
| 2020/0355831 A1* | 11/2020 | Gassend | G01S 17/10 |
| 2023/0221728 A1* | 7/2023 | Iwase | G05D 1/0246 |

* cited by examiner

MOVABLE OBJECT, DISTANCE MEASUREMENT METHOD, AND DISTANCE MEASUREMENT PROGRAM

CROSS-REFERENCE TO RELATED APPLICATION

This application is based upon and claims the benefit of priority from Japanese Patent Application No. 2020-095052, filed May 29, 2020; the entire contents of (all of) which are incorporated herein by reference.

FIELD

Embodiments described herein relate generally to a movable object, a distance measurement method, and a distance measurement program.

BACKGROUND

Movable objects (a robot vehicle and an automated guided vehicle), which operate while measuring a distance to a surrounding environment using a distance sensor such as a laser range finder (LRF), are used for transportation and the like. A method of correcting the distance to an obstacle or the like measured by a tilted distance sensor when a movable object is tilted due to an influence of a load or the like has been devised. However, for example, when a tilt angle of the distance sensor is large and the distance sensor measures a distance to a floor instead of an obstacle or the like, the method of correcting the distance as described above cannot prevent erroneous detection.

An embodiment of the present invention provides a movable object, a distance measurement method, and a distance measurement program capable of preventing erroneous detection due to a tilt of a distance sensor.

DETAILED DESCRIPTION

According to one embodiment, a movable object is provided including: a vehicle body; a distance measurement part configured to measure a distance to a physical object; an orientation measurement part configured to measure an orientation angle of the vehicle body; and a control device connected to the distance measurement part and the orientation measurement part. The control device acquires a measurement value of a detection range from the distance measurement part, calculates a valid range of the detection range on the basis of the orientation angle acquired from the orientation measurement part and invalidates the measurement value of an invalid range not included in the valid range.

According to one embodiment, a distance measurement method is provided including: a measurement value acquisition process of acquiring a measurement value in a detection range from a distance sensor; an orientation angle process of acquiring an orientation angle of a vehicle body from a tilt sensor; a valid range calculation step of calculating a valid range in the detection range based on the orientation angle; and a measurement value invalidation step of invalidating the measurement value in an invalid range not included in the valid range of the detection range.

According to one embodiment, a distance measurement program is provided that controls a movable object including a vehicle body, a distance measurement part that measures a distance to a physical object, an orientation measurement part that measures an orientation angle of the vehicle body, and a control device connected to the distance measurement part and the orientation measurement part. The program makes the control device acquire a measurement value of a detection range from the distance measurement part, makes the control device calculate a valid range of the detection range based on the orientation angle acquired from the orientation measurement part, and makes the control device invalidate the measurement value in the invalid range that is not included in the valid range in the detection range.

Various Embodiments will be described hereinafter with reference to the accompanying drawings.

Hereinafter, a movable object, a distance measurement method, and a distance measurement program according to embodiments will be described with reference to the drawings. Redundant descriptions of components of the above may be omitted. The term "based on XX" mentioned in the present application means "based on at least XX" and also includes a case based on another element in addition to XX. Also, the term "based on XX" is not limited to a case in which XX is directly used and includes a case based on a result of performing calculation or processing on XX. "XX" is any element (for example, any information).

In the present application, X, Y and Z directions of the Cartesian coordinate system are defined as follows. The Z direction is a vertical direction and a +Z direction is an upward direction. The X direction is a horizontal direction, which is a forward-rearward direction of a movable object, and a +X direction is the forward direction of the movable object. The Y direction is a horizontal direction, a direction orthogonal to the X direction, and a left-right direction (a width direction) of the movable object. Also, the term such as "forward direction" in the present specification is expressed from a viewpoint based on one moving direction of the movable object for convenience of description. However, the moving direction of the movable object is not limited to the +X direction. For example, the movable object may be movable in the Y direction.

First Embodiment

[Automated Guided Vehicle 200]

Figure 1:
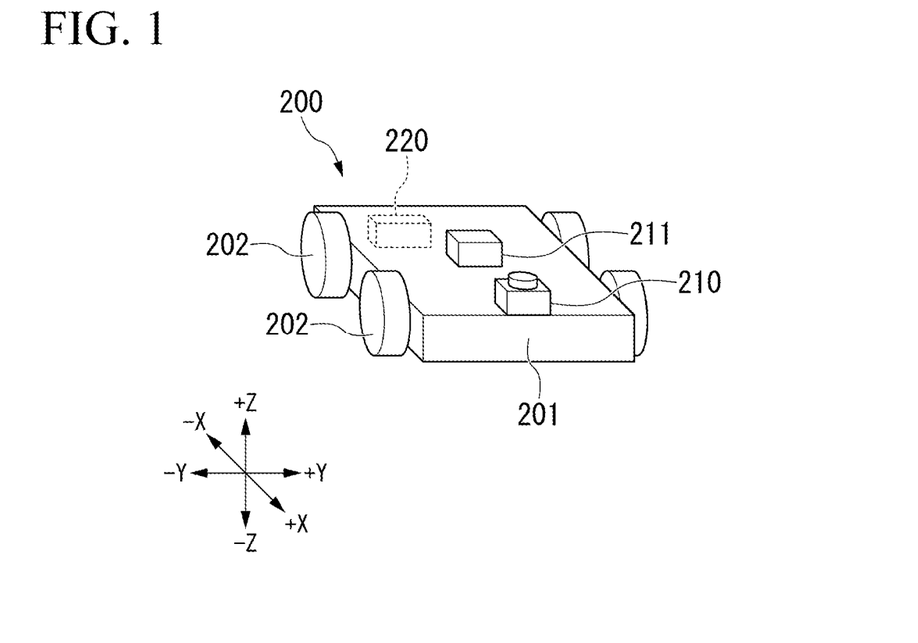
FIG. 1 is a perspective view of an automated guided vehicle according to a first embodiment.

FIG. 1 is a perspective view of an automated guided vehicle 200 according to the first embodiment.

The automated guided vehicle 200 is, for example, a lineless type autonomous moving truck that does not require control from an operator and does not require lines drawn on a floor. The automated guided vehicle 200 is, for example, a low-floor autonomous moving truck, goes under a cart, and is combined with the cart to transport the cart. However, the automated guided vehicle 200 is not limited to the above-described example and may be another type of automated guided vehicle. For example, the automated guided vehicle 200 may be controlled by an operator. The automated guided vehicle 200 is an example of a movable object.

The automated guided vehicle 200 includes a vehicle body 201, wheels 202, drive motors for driving the wheels 202, a distance measurement part 210, an orientation measurement part 211, and a control device 220.

The vehicle body 201 is formed in a substantially rectangular parallelepiped box shape. The vehicle body 201 is disposed at a center of the automated guided vehicle 200 in a plan view.

The wheels 202 are disposed on outer sides of four corners of the vehicle body 201 in a plan view. The wheels 202 have axles parallel to the Y direction. The drive motors (not shown) are disposed on inner sides of the four corners of the vehicle body 201. The drive motors rotationally drive the plurality of wheels 202 independently of each other. An encoder configured to detect an amount of rotation is attached to the drive motor.

As the wheels 202, for example, Mecanum wheels, are formed. The Mecanum wheels have pluralities of barrels on the circumferences of the wheels 202. The barrels freely rotate around rotating shafts that are tilted 45 degrees with respect to the axles of the wheels 202. The Mecanum wheels move the vehicle body 201 in all directions by changing a combination of a rotation direction and a rotation speed of the four wheels 202. The four wheels 202 may be a normal two-wheel independent drive system (two drive wheels and two driven wheels), or a steering wheel system called an active caster.

Figure 2:
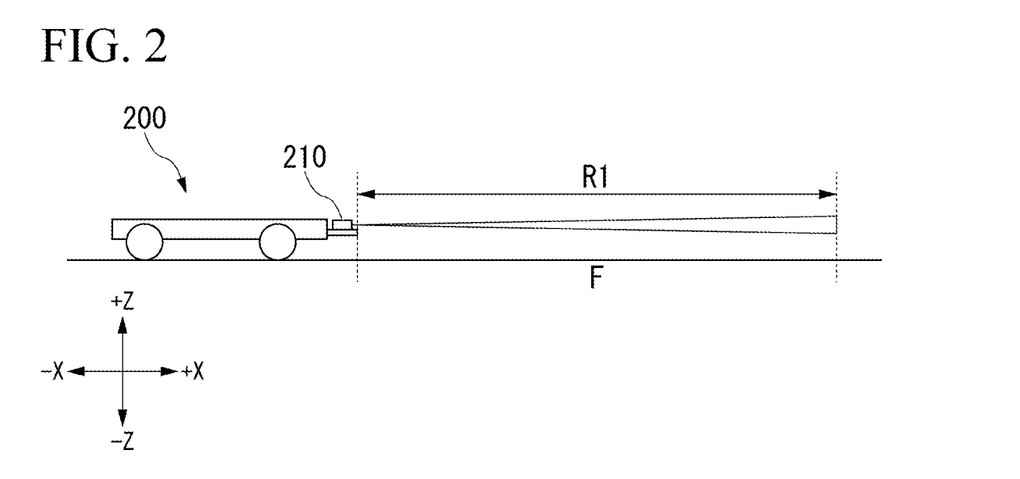
FIG. 2 is a diagram showing a detection range of a distance measurement part of the automated guided vehicle.

FIG. 2 is a diagram showing a detection range R1 of the distance measurement part 210.

The distance measurement part 210 is a distance sensor that measures a distance to a physical object and is, for example, a laser range finder (LRF). The distance measurement part 210 is attached to an end of the vehicle body 201 in the forward direction (the +X direction). A laser scanning range of the distance measurement part 210 is, for example, a range of 270 degrees. The distance measurement part 210 can detect the presence or absence of a physical object in a detection range R1 according to the presence or absence of reflection of a laser radiated by the LRF. The detection range R1 is, for example, about 15 m. The distance measurement part 210 can detect the distance to the physical object and a direction of the physical object according to a degree of reflection of the radiated laser. The distance measurement part 210 outputs data indicating the presence or absence of the physical object, the distance to the physical object, and the direction of the physical object. In the following description, an output of the distance measurement part 210 is referred to as a "measurement value." Also, the distance measurement part 210 is not limited to the above-described example and may be another type of sensor. For example, the distance measurement part 210 may be a position sensitive detector (PSD) sensor or an ultrasonic sensor.

The orientation measurement part 211 is a tilt sensor that measures an orientation angle A of the vehicle body 201 and is, for example, an inertial measurement unit (IMU) sensor. In the present embodiment, the orientation angle A is a tilt angle of the vehicle body 201 with respect to a gravity direction and is a tilt angle in the forward-rearward direction (the X direction) and the left-right direction (the Y direction). For example, the orientation measurement part 211 is attached to the center of the vehicle body 201 in a plan view. The orientation measurement part 211 may be attached at a position adjacent to the distance measurement part 210.

Figure 3:
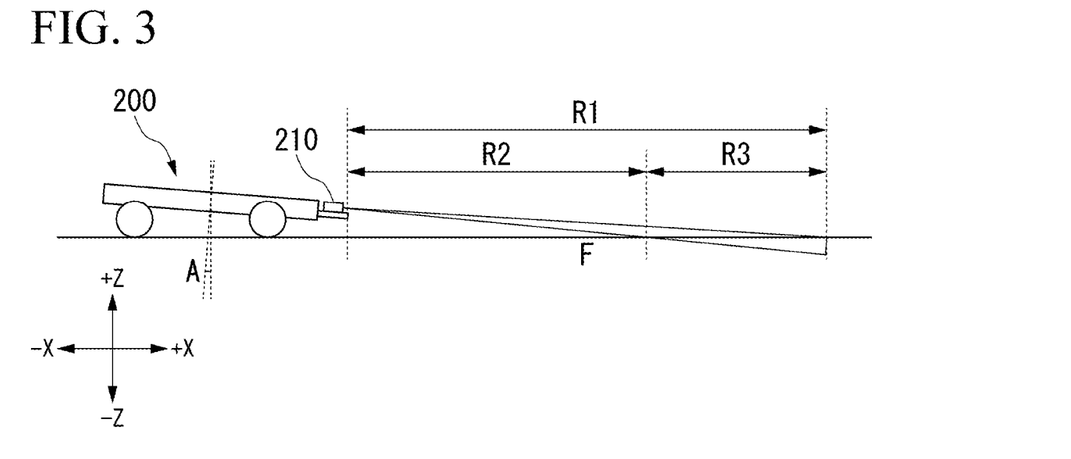
FIG. 3 is a diagram showing a valid range of the distance measurement part.

FIG. 3 is a diagram showing a valid range R2 of the distance measurement part 210.

As shown in FIG. 3, when the orientation angle A of the vehicle body 201 is larger than a predetermined angle, the distance measurement part 210 measures a distance to a floor F instead of a physical object on the floor F. In this case, the distance measurement part 210 cannot determine whether the measurement value is a measurement value obtained by measuring the distance to the physical object on the floor F or a measurement value obtained by measuring the distance to the floor F. Also, the distance measurement part 210 detects that "there is a physical object" even though there is no physical object by detecting the floor F. In order to prevent the above-described erroneous detection, the "valid range R2," which is a range in which the measurement value acquired by the distance measurement part 210 is valid, is defined within the detection range R1. Measurement values in the valid range R2 do not include a measurement value when the floor F is detected.

The control device 220 is a device that acquires outputs of the distance measurement part 210 and the orientation measurement part 211 and controls the wheels 202, the drive motor, and the like on the basis of outputs of the distance measurement part 210 and the orientation measurement part 211 and the like. The control device 220 includes a computer having a processor such as a CPU, a memory, and a storage medium, and can execute software. A control function of the control device 220 is implemented by software.

Figure 4:
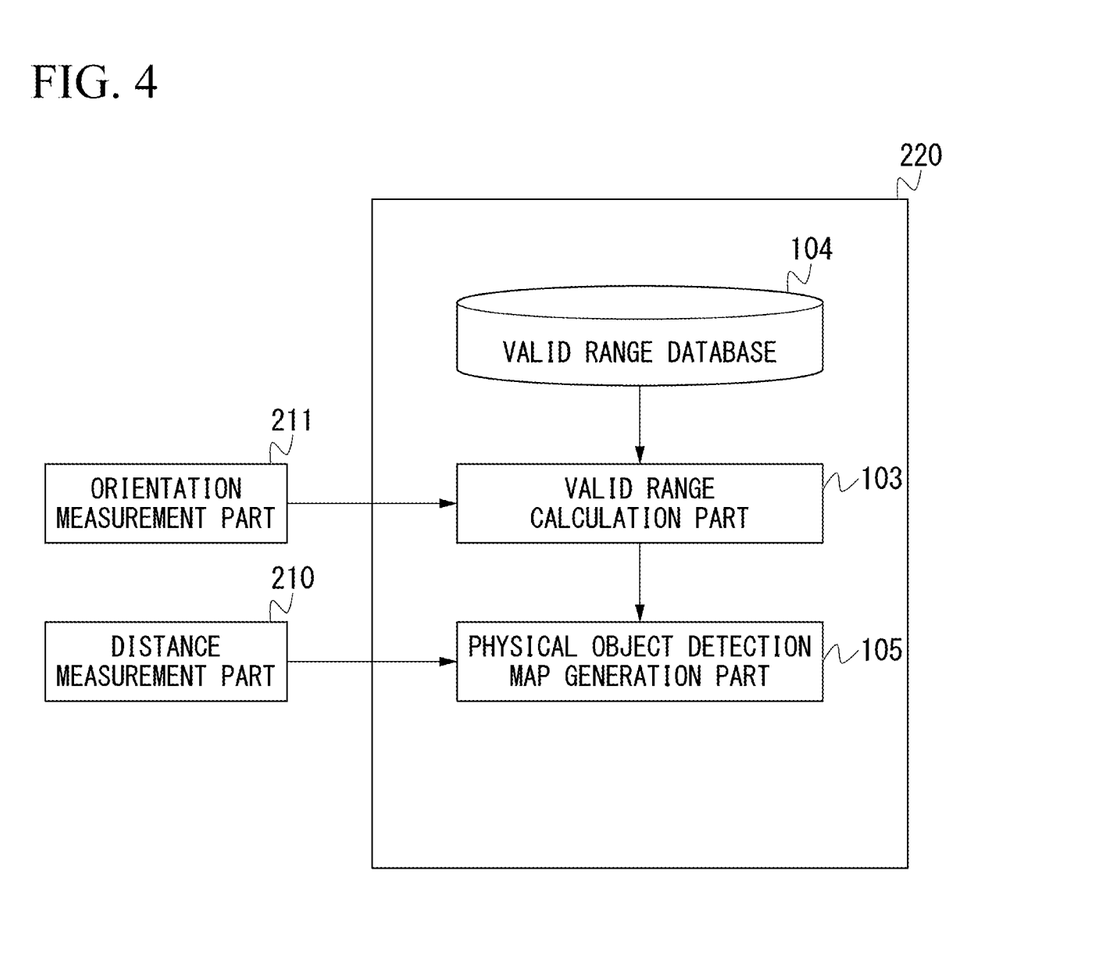
FIG. 4 is a functional block diagram of a control device of the automated guided vehicle.

FIG. 4 is a functional block diagram of the control device 220.

The control device 220 has a valid range calculation part 103, a valid range database 104, and a physical object detection map generation part 105.

The valid range calculation part 103 acquires the orientation angle A output by the orientation measurement part 211. Also, the valid range calculation part 103 calculates the "valid range R2" which is a range in which the measurement value acquired by the distance measurement part 210 is valid within the detection range R1 on the basis of the orientation angle A. The valid range calculation part 103 calculates the valid range R2 using the valid range database 104.

The valid range database 104 is a database in which the orientation angle A and the valid range R2 are associated with each other. The valid range database 104 outputs the valid range R2 corresponding to the orientation angle A input from the valid range calculation part 103 to the valid range calculation part 103.

Figure 5:
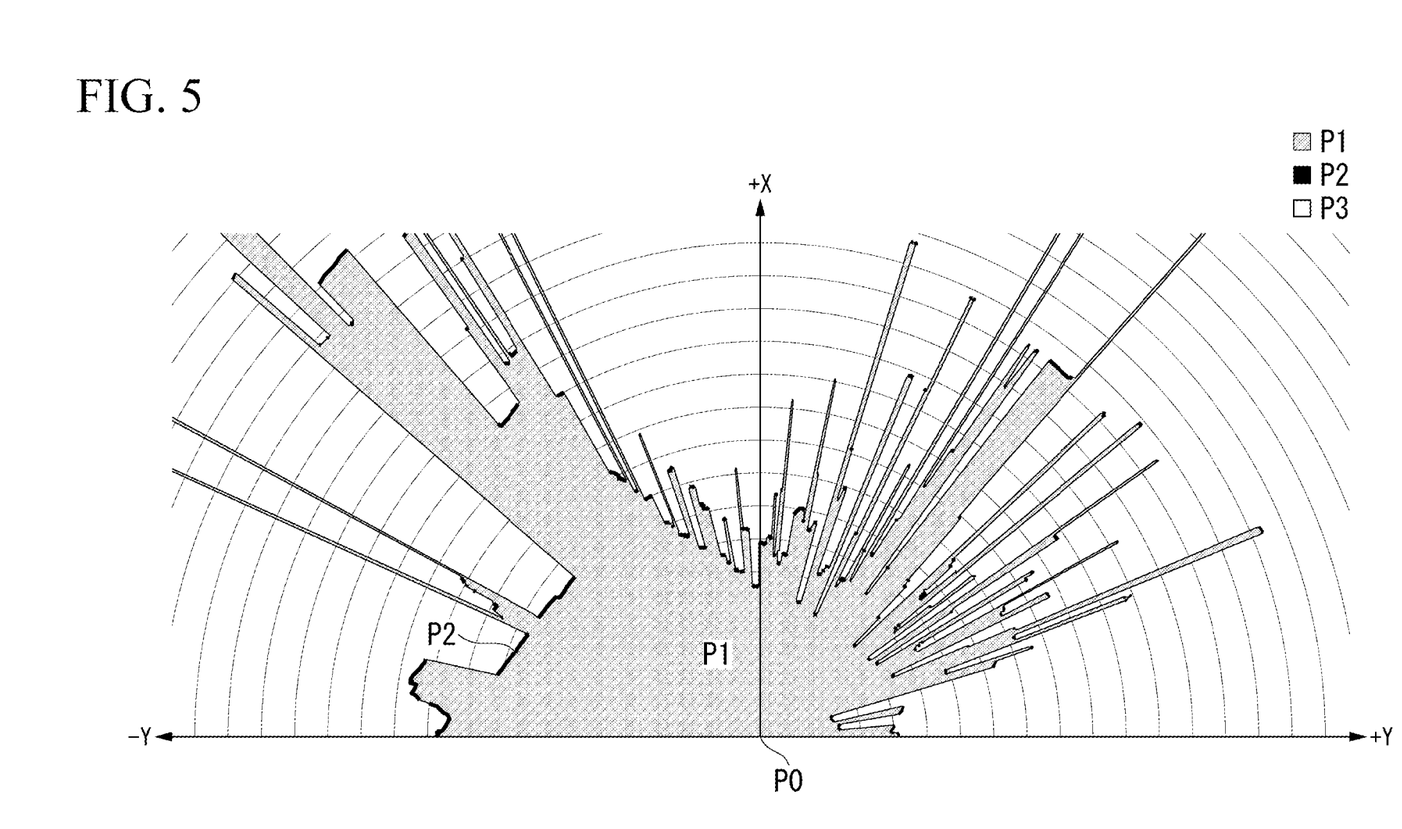
FIG. 5 is an example of a physical object detection map in which a measurement value is visualized.

FIG. 5 is an example of the physical object detection map M in which a measurement value is visualized.

The physical object detection map generation part 105 generates a physical object detection map M indicating the presence or absence of a physical object from the measurement values output by the distance measurement part 210. In the physical object detection map M, P0 indicates a position of the distance measurement part 210. In the physical object detection map M, an area where there is no physical object is recorded as "P1 without a physical object." In the physical object detection map M, an area where there is a physical object is recorded as "P2 with a physical object." In the physical object detection map M, an area where it is unknown whether or not there is a physical object is recorded as "indefinite data P3."

[Operation of Automated Guided Vehicle 200]

Next, an operation of the automated guided vehicle 200 will be described. The description will be given with reference to a control flowchart of the control device 220 shown in FIG. 6.

Figure 6:
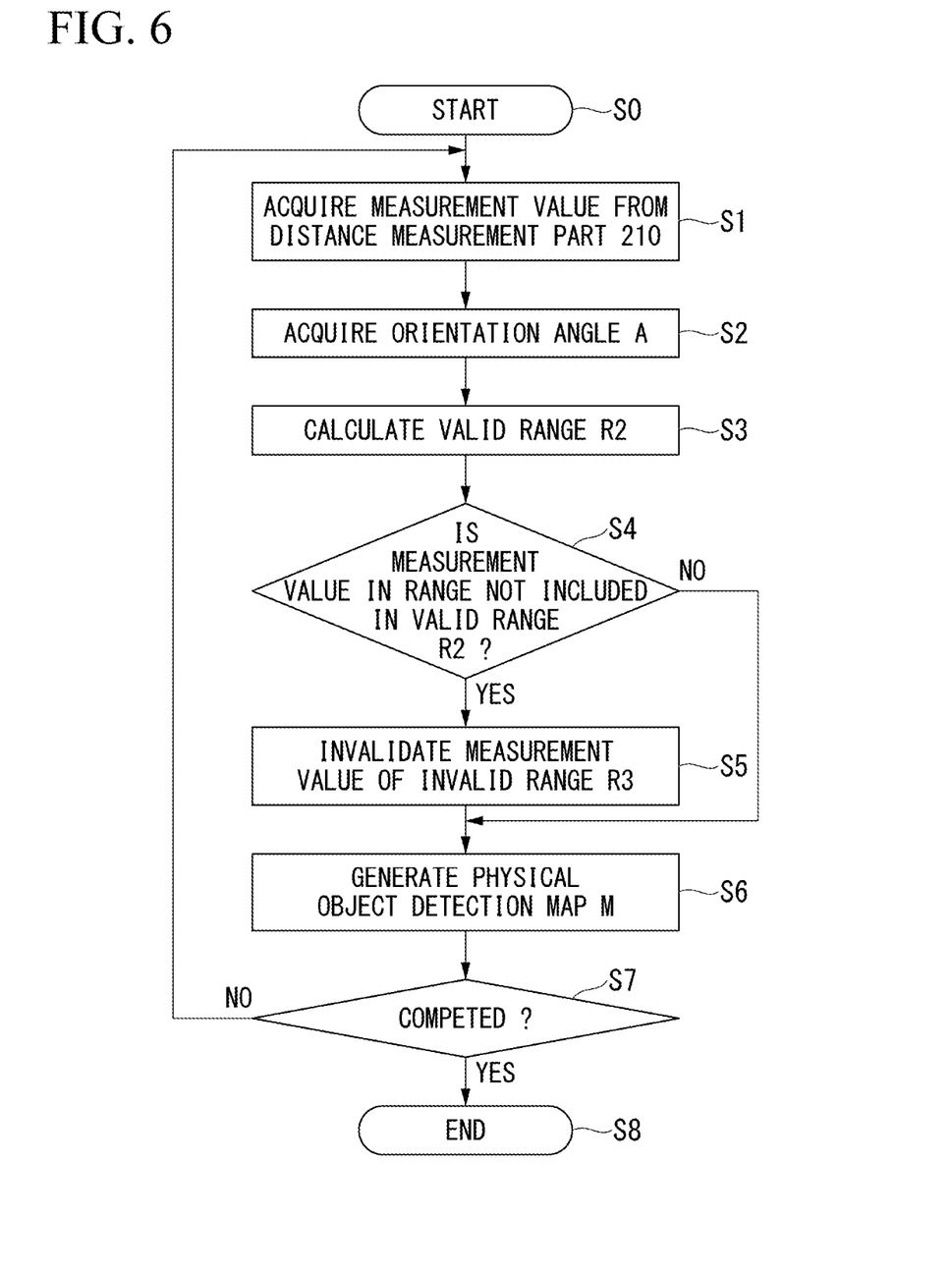
FIG. 6 is a control flowchart of the control device.

When the control device 220 is activated, the control device 220 starts controlling the automated guided vehicle 200 after initializing the distance measurement part 210 and the orientation measurement part 211 (step S0). Next, the control device 220 executes step S1.

Figure 7:
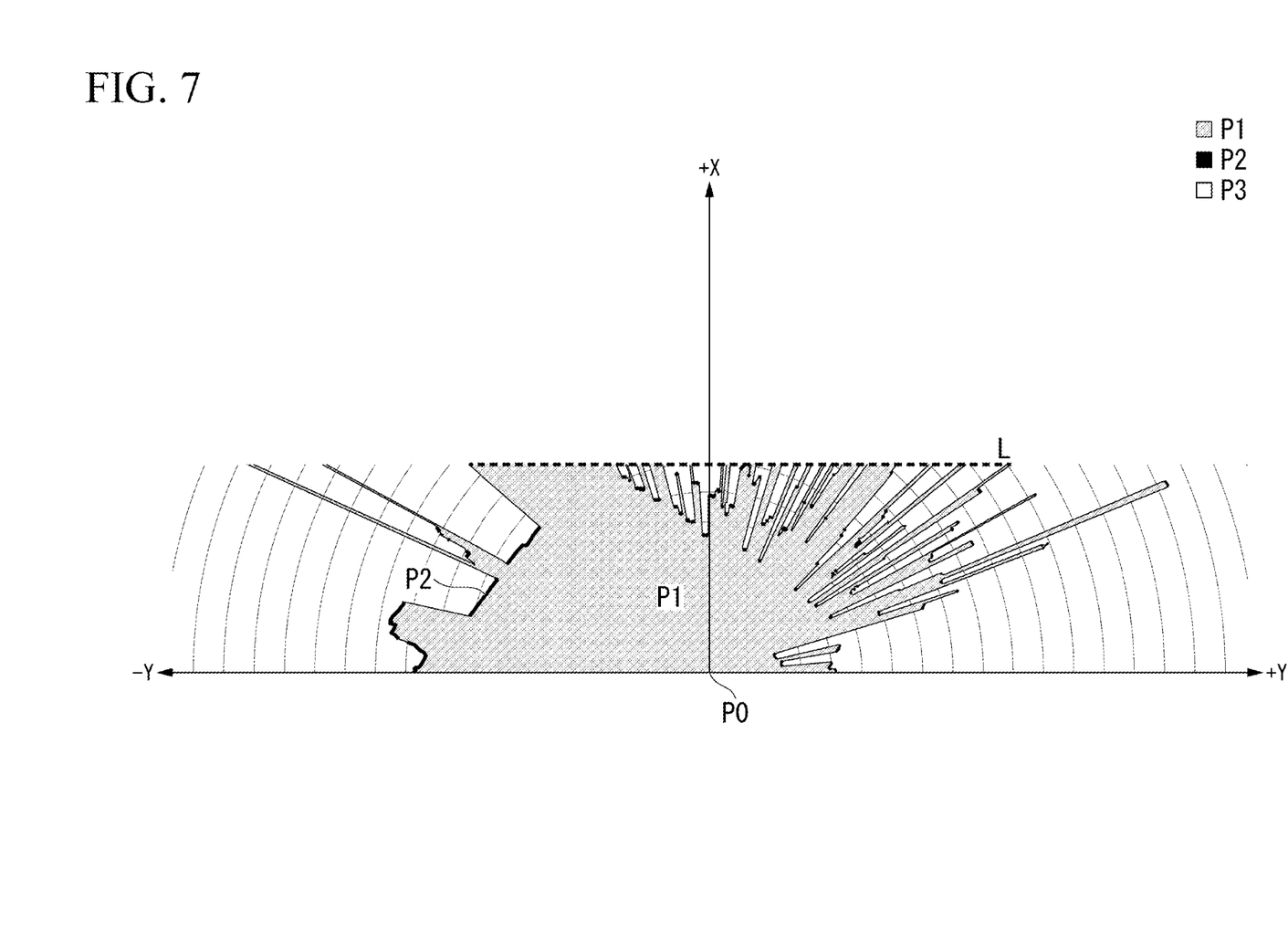
FIG. 7 is an example of a physical object detection map in which a measurement value output by the distance measurement part is visualized.

In step S1, the control device 220 acquires a measurement value output by the distance measurement part 210 (a measurement value acquisition process). FIG. 7 is an example of a physical object detection map M in which the measurement value output by the distance measurement part 210 is visualized. In the physical object detection map M shown in FIG. 7, a line area L where there is P2 on a line is detected in the forward direction (+X) of the distance measurement part 210. The control device 220 cannot determine whether the line area L is a large physical object such as a wall or the floor F only from the measurement values output by the distance measurement part 210. Next, the control device 220 executes step S2.

In step S2, the control device 220 acquires the orientation angle A output by the orientation measurement part 211 (an orientation angle acquisition process). Next, the control device 220 executes step S3.

In step S3, the control device 220 calculates the valid range R2 in the detection range R1 on the basis of the orientation angle A (a valid range calculation process). The control device 220 calculates the valid range R2 corresponding to the orientation angle A using the valid range database 104. Next, the control device 220 executes step S4.

In step S4, the control device 220 determines whether the measurement value is included in a range (an invalid range R3) not included in the valid range R2 within the detection range R1. When the invalid range R3 includes the measurement value, the control device 220 executes step S5. When the invalid range R3 does not include the measurement value, the control device 220 executes step S6.

In step S5, the control device 220 invalidates the measurement value in the range (the invalid range R3) not included in the valid range R2 on the basis of the valid range R2 (a measurement value invalidation process). Specifically, the control device 220 replaces the measurement value of "P1 without a physical object" or "P2 with a physical object" included in the invalid range R3 with "indefinite data P3." It is desirable to designate the area to be replaced with the "indefinite data P3" as an area R4 slightly extended from the invalid range R3 in consideration of an error of the distance measurement part 210 or the like. Next, the control device 220 executes step S6.

Figure 8:
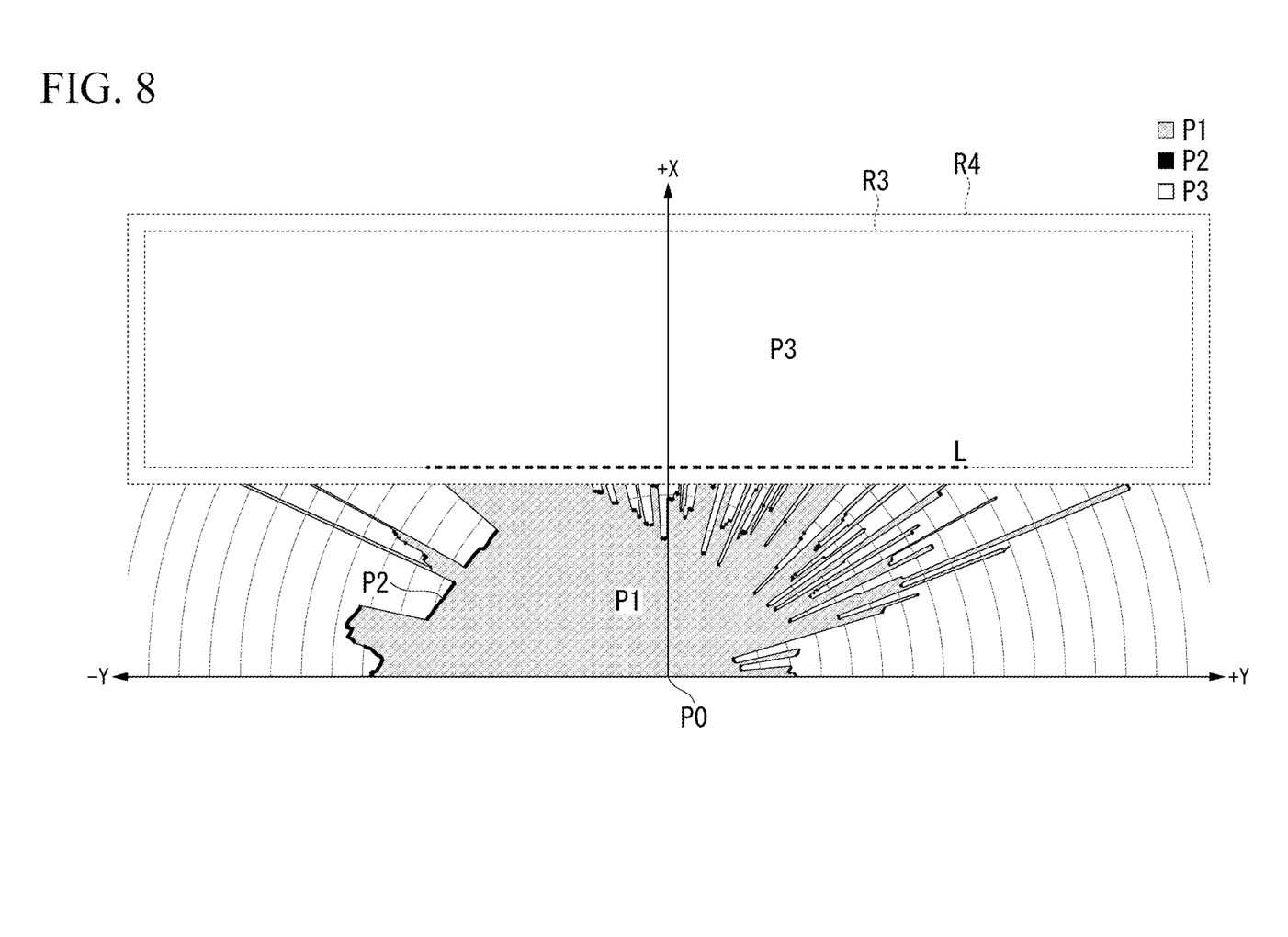
FIG. 8 is an example of a physical object detection map that has been generated.

In step S6, the control device 220 generates a final physical object detection map M (a physical object detection map generation process). FIG. 8 is an example of the generated physical object detection map M. Because the line area L is included in the invalid range R3 in FIG. 8, the control device 220 can determine that the line area L is the floor F instead of a physical object. A measurement value of the invalid range R3 including the line area L is recorded as the "indefinite data P3." That is, when the distance measurement part 210 measures a distance to the floor F instead of the physical object, the control device 220 replaces measurement values in the vicinity of the floor F and in front of the floor F with the "indefinite data P3" without correcting the measurement values. Next, the control device 220 executes step S7.

In step S7, the control device 220 determines whether the control of the automated guided vehicle 200 is to be ended. When the control of the automated guided vehicle 200 is to be ended, the control device 220 executes step S8 to end the control. When the control of the automated guided vehicle 200 is not to be ended, the control device 220 executes step S1 again.

[Valid Range Database 104]

Next, a method of generating the valid range database 104 will be described. A user of the automated guided vehicle 200 generates the valid range database 104 in advance according to the following method.

Figure 9:
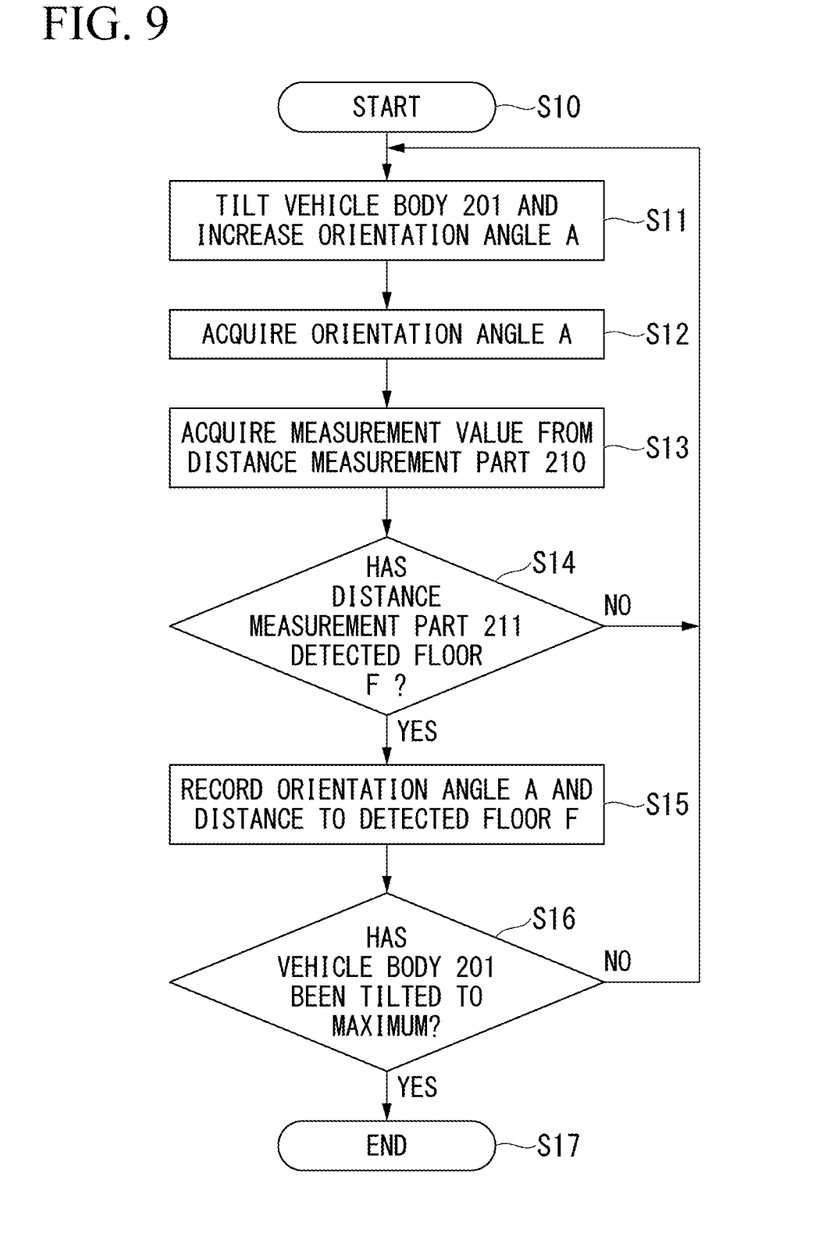
FIG. 9 is a flowchart of generation of a valid range database.

FIG. 9 is a flowchart of generation of the valid range database 104.

The user installs the automated guided vehicle 200 in an environment where there are no physical objects on the floor F. In this state, when the control device 220 of the automated guided vehicle 200 detects a physical object, the distance measurement part 210 detects the floor F instead of the physical object.

In step S11, the control device 220 starts the control flow of the control device 220 shown in FIG. 6. The user tilts the vehicle body 201 of the automated guided vehicle 200 and gradually increases an orientation angle A according to a method of manually titling the vehicle body 201 of the automated guided vehicle 200 or the like. Next, the control device 220 executes step S12 and step S13.

In step S12, the control device 220 acquires the orientation angle A output by the orientation measurement part 211. Next, in step S13, the control device 220 acquires a measurement value output by the distance measurement part 210. Next, the control device 220 executes step S14.

In step S14, the control device 220 determines whether the distance measurement part 210 has detected the floor F. As described above, because the automated guided vehicle 200 is installed in an environment where there are no physical objects, it can be determined that the physical object detected by the distance measurement part 210 is the floor F. Next, the control device 220 executes step S15.

In step S15, the control device 220 associates the orientation angle A with a distance to the detected floor F and records an association result in the valid range database 104. Next, the control device 220 executes step S16.

In step S16, the control device 220 determines whether the vehicle body 201 has been tilted to the maximum. When the vehicle body 201 has not been tilted to the maximum, the control device 220 performs step S11 again. When the vehicle body 201 has been tilted to the maximum, the control device 220 executes step S17 to end the process.

The control device 220 causes the vehicle body 201 to be tilted in the forward-rearward direction (the X direction) and the left-right direction (the Y direction), and records relationships between orientation angles A in various orientations and a distance to the detected floor F in the valid range database 104. As a result, the valid range database 104, which outputs the valid range R2 corresponding to the input orientation angle A, is generated.

Summary of First Embodiment

According to the automated guided vehicle 200 of the present embodiment, it is possible to prevent erroneous detection due to a tilt of the distance measurement part 210. A measurement value of the range (the invalid range R3) not included in the valid range R2 is invalidated on the basis of the valid range R2 corresponding to the orientation angle A of the vehicle body 201. As a result, it is possible to prevent the control device 220 of the automated guided vehicle 200 from erroneously detecting the floor F as a physical object other than the floor F.

According to the automated guided vehicle 200 of the present embodiment, the measurement value in the invalid range R3 is not corrected but is replaced with the "indefinite data P3." Thus, the automated guided vehicle 200 can simplify the control flow of the control device 220. The area replaced with the "indefinite data P3" in the physical object detection map M is measured again when the automated guided vehicle 200 approaches the area and is determined to be either "P1 without a physical object" or "P2 with a physical object." That is, the automated guided vehicle 200 replaces a measurement value of the invalid range R3 with the "indefinite data P3," so that a determination of the presence or absence of a physical object in the invalid range R3 where erroneous detection can occur is not performed and is postponed. Because the automated guided vehicle 200 has a main purpose of moving, there is no substantial disadvantage even if the above-described postponement process is performed.

According to the automated guided vehicle 200 of the present embodiment, for example, when the distance measurement part 210 is attached at a low position of the automated guided vehicle 200, erroneous detection due to the tilt of the distance measurement part 210 can be prevented more reliably. This is because, when the distance measurement part 210 is attached at the low position of the automated guided vehicle 200, the distance measurement part 210 faces the floor F even if the vehicle body 201 is slightly tilted.

According to the automated guided vehicle 200 of the present embodiment, for example, when the detection range R1 of the distance measurement part 210 is wide, erroneous detection due to the tilt of the distance measurement part 210 can be prevented more reliably. This is because, when the detection range R1 of the distance measurement part 210 is wide, the distance measurement part 210 faces the floor F even if the vehicle body 201 is slightly tilted.

Modified Example 1

Figure 10:
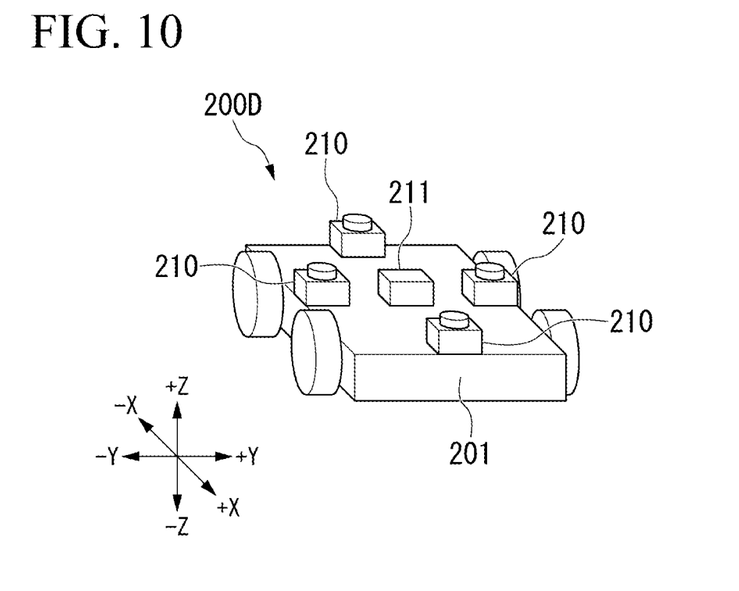
FIG. 10 is a perspective view of a modified example of the automated guided vehicle.

In each of the above-described embodiments, the automated guided vehicle 200 includes the distance measurement part 210 at the end thereof in the forward direction (the +X direction). However, a form of the distance measurement part 210 included in the automated guided vehicle 200 is not limited to the above. FIG. 10 is a perspective view of an automated guided vehicle 200D, which is a modified example of the automated guided vehicle 200. The automated guided vehicle 200D includes distance measurement parts 210 at front, rear, left and right ends thereof. The automated guided vehicle 200D can measure distances to a physical object in a forward direction, a rearward direction, a left direction, and a right direction. The automated guided vehicle 200D can detect the presence or absence of a physical object in a wider area in a short period of time. A measurement value in a range (the invalid range R3) in which a measurement value measured by any distance measurement part 210 is not included in the valid range R2 is invalidated.

Second Embodiment

An automated guided vehicle 200B of a second embodiment will be described. In the following description, the same reference signs will be given to components that are the same as those described above and redundant description thereof will be omitted. An orientation measurement part of the automated guided vehicle 200B of the second embodiment is different from the orientation measurement part 211 of the automated guided vehicle 200 of the first embodiment.

Figure 11:
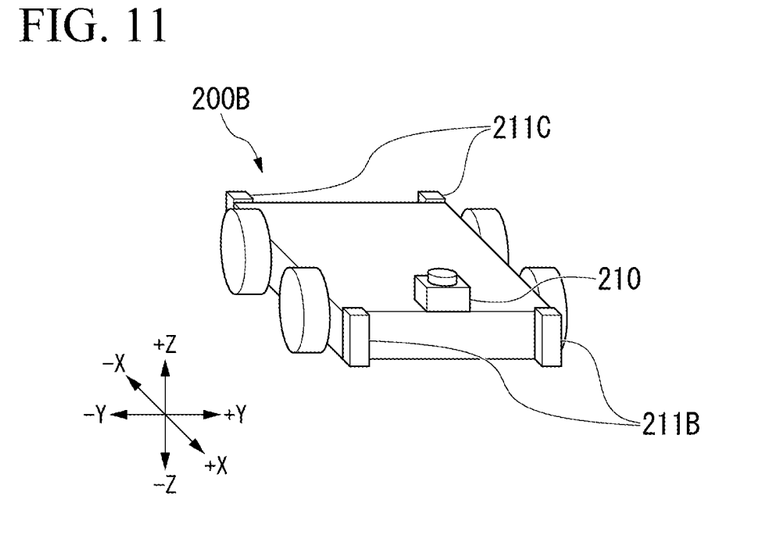
FIG. 11 is a perspective view of an automated guided vehicle according to a second embodiment.

FIG. 11 is a perspective view of the automated guided vehicle 200B according to the second embodiment.

The automated guided vehicle 200B includes a vehicle body 201, wheels 202, drive motors for driving the wheels 202, a distance measurement part 210, orientation measurement parts 211B, and a control device 220.

The orientation measurement parts 211B are sensors provided at four corners of the vehicle body 201 in a plan view, and measure distances to a floor F. The control device 220 can acquire an orientation angle A of the vehicle body 201 from the distances to the floor F measured by the orientation measurement parts 211B.

The control device 220 calculates the valid range R2 in the detection range R1 on the basis of the acquired orientation angle A as in the first embodiment.

As in the first embodiment, the control device 220 invalidates measurement values in the range (the invalid range R3) not included in the valid range R2 on the basis of the valid range R2.

According to the automated guided vehicle 200B of the present embodiment, it is possible to prevent erroneous detection due to a tilt of the distance measurement part 210 as in the first embodiment.

According to the automated guided vehicle 200B of the present embodiment, as in the first embodiment, the measurement value in the invalid range R3 is not corrected but is replaced with "indefinite data P3." Therefore, the automated guided vehicle 200 can simplify a control flow of the control device 220.

According to the automated guided vehicle 200B of the present embodiment, the control device 220 can acquire the orientation angle A with respect to the floor F where the automated guided vehicle 200B moves. Thus, for example, even if the floor F is tilted from a horizontal plane, the valid range R2 can be calculated appropriately.

Third Embodiment

An automated guided vehicle 200C of the third embodiment will be described. In the following description, the same reference signs will be given to components that are the same as those described above and redundant description thereof will be omitted. An orientation measurement part of the automated guided vehicle 200C of the third embodiment is different from the orientation measurement part 211 of the automated guided vehicle 200 of the first embodiment.

Figure 12:
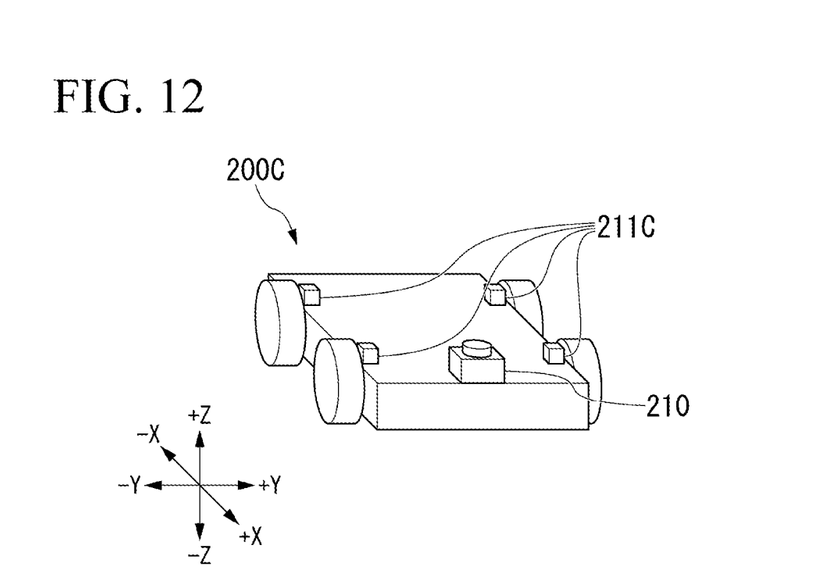
FIG. 12 is a perspective view of an automated guided vehicle according to a third embodiment.

FIG. 12 is a perspective view of the automated guided vehicle 200C according to the third embodiment.

The automated guided vehicle 200C includes a vehicle body 201, wheels 202, a drive motor for driving the wheels 202, a distance measurement part 210, orientation measurement parts 211C, and a control device 220.

The orientation measurement parts 211C are sensors provided on suspensions of the four wheels 202 and measure displacements (sinking quantities) of the suspensions in a vertical direction (a Z direction). The control device 220 can acquire an orientation angle A of the vehicle body 201 from the vertical displacements of the suspensions measured by the orientation measurement parts 211C.

The control device 220 calculates a valid range R2 in a detection range R1 on the basis of the acquired orientation angle A as in the first embodiment.

As in the first embodiment, the control device 220 invalidates measurement values in a range (an invalid range R3) not included in the valid range R2 on the basis of the valid range R2.

According to the automated guided vehicle 200C of the present embodiment, it is possible to prevent erroneous detection due to a tilt of the distance measurement part 210 as in the first embodiment.

According to the automated guided vehicle 200C of the present embodiment, as in the first embodiment, the measurement value in the invalid range R3 is not corrected but is replaced with "indefinite data P3." Thus, the automated guided vehicle 200C can simplify a control flow of the control device 220.

According to the automated guided vehicle 200C of the present embodiment, the control device 220 can acquire the orientation angle A with respect to the floor F where the automated guided vehicle 200C moves. Thus, for example, even if the floor F is tilted from a horizontal plane, the valid range R2 can be calculated appropriately. Because the displacement of the suspension in the vertical direction is a parameter that directly represents a relative tilt of the vehicle body 201, a more accurate orientation angle A can be acquired and the valid range R2 can be calculated more appropriately.

Modified Example 2

In each of the above-described embodiments, the control device 220 calculates the valid range R2 using the valid range database 104 in which the orientation angle A is associated with a distance from the distance measurement part 210 to the floor. However, a method of calculating the valid range R2 is not limited to the above. For example, the control device 220 may calculate the valid range R2 from a physical model of the automated guided vehicle 200 and the floor F without using the valid range database 104.

Modified Example 3

Although the description has been given using the automated guided vehicle 200 or the like as an example of the movable object in each of the above-described embodiments, the movable object is not limited thereto. The movable object may be, for example, a manned guided vehicle. Also, the movable object is not limited to a vehicle which travels on wheels, and may be, for example, a walking robot or a hovercraft.

Modified Example 4

Although the description has been given using the four-wheel automated guided vehicle 200 or the like as an example of the movable object in each of the above embodiments, the movable object is not limited thereto. The movable object may be, for example, a two-wheeled movable object or a three-wheeled truck. In the case of a two-wheeled movable object, the orientation angle A of the movable object is liable to fluctuate, and thus erroneous detection due to a tilt of the distance measurement part 210 can be prevented more reliably.

Also, a function of the movable object in the above-described embodiment may be implemented by a computer. In this case, the function may be implemented by recording a program for implementing this function on a computer-readable recording medium and causing a computer system to read and execute the program recorded on the recording medium. Also, the "computer system" described here may include an operating system (OS) and hardware such as peripheral devices. Also, the "computer-readable recording medium" refers to a storage device including a flexible disk, a magneto-optical disc, a read only memory (ROM), a digital versatile disc (DVD)-ROM, a portable medium such as a Universal Serial Bus (USB) memory, and a hard disk embedded in the computer system. Further, the "computer-readable recording medium" is assumed to include a computer-readable recording medium for dynamically retaining a program for a short time as in a communication line when the program is transmitted via a network such as the Internet or a communication circuit such as a telephone circuit and a computer-readable recording medium for retaining the program for a predetermined time period as in a volatile memory inside the computer system including a server and a client when the program is transmitted. Also, the above-described program may be a program for implementing some of the above-described functions. Further, the above-described program may be a program capable of implementing the above-described functions in combination with a program already recorded on the computer system.

According to some embodiments described above, it is possible to prevent erroneous detection due to a tilt of a distance measurement part by invalidating a measurement value of the invalid range R3.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover the forms and modifications that fall within the scope and spirit of the inventions.

What is claimed is:

1. A movable object comprising:
a vehicle body;
a distance sensor that measures a distance to a physical object;
a tilt sensor that measures an orientation angle of the vehicle body; and
a controller connected to the distance sensor and the tilt sensor,
wherein:
the controller
acquires a measurement value of a detection range from the distance sensor,
generates an object detection map based on the measurement value acquired from the distance sensor, the object detection map including a first record, a second record, and a third record, the first record serving as an area where there is no physical object, the second record serving as an area where there is the physical object, the third record serving as an area where the presence or absence of the physical object is unknown, calculates a valid range of the detection range on the basis of the orientation angle acquired from the tilt sensor, invalidates the measurement value of an invalid range not included in the valid range by replacing the measurement value of the invalid range with the third record, postpones a determination of the presence or absence of the physical object in the invalid range, and after the vehicle body approaches the invalid range, acquires a measurement value of the invalid range from the distance sensor again, and determines the presence or absence of the physical object on the basis of the measurement value of the invalid range, the valid range is defined as a range where the distance between the physical object and the vehicle body is measured by the distance sensor.

2. The movable object according to claim 1, wherein the controller calculates the valid range based on a relationship between the orientation angle and a distance from the distance sensor to a floor.

3. The movable object according to claim 2, wherein the controller calculates the valid range based on a database that associates the orientation angle with the distance to the floor, and wherein the movable object is installed in an environment where there is no physical object on the floor and the vehicle body of the movable object is manually tiled to gradually increase the orientation angle for acquiring and associating the orientation angle with the distance until the distance sensor detects the floor, and an association result between the orientation angle with the distance is recorded in the database.

4. The movable object according to claim 1, wherein the measurement value acquired from the distance sensor is data indicating presence or absence of the physical object.

5. The movable object according to claim 1, wherein the controller invalidates the measurement value in a region where the invalid range is extended.

6. A distance measurement method comprising:

acquiring a measurement value in a detection range from a distance sensor;

generating an object detection map based on the measurement value acquired from the distance sensor, the object detection map including a first record, a second record, and a third record, the first record serving as an area where there is no physical object, the second record serving as an area where there is the physical object, the third record serving as an area where the presence or absence of the physical object is unknown;

acquiring an orientation angle of a vehicle body from a tilt sensor;

calculating a valid range in the detection range based on the orientation angle;

invalidating the measurement value in an invalid range not included in the valid range of the detection range by replacing the measurement value of the invalid range with the third record;

postponing a determination of the presence or absence of the physical object in the invalid range; and after the vehicle body approaches the invalid range, acquiring a measurement value of the invalid range from the distance sensor again, and determining the presence or absence of the physical object on the basis of the measurement value of the invalid range, wherein:

the valid range is defined as a range where the distance between a physical object on a floor and the vehicle body is measured by the distance sensor.

7. The distance measurement method according to claim 6, wherein, when calculating the valid range in the detection range based on the orientation angle, the valid range is calculated based on a relationship between the orientation angle and a distance to the floor.

8. The distance measurement method according to claim 7, wherein when calculating the valid range in the detection range based on the orientation angle, the valid range is calculated based on a database that associates the orientation angle with the distance to the floor, and wherein the database is acquired by:

installing a movable object having the vehicle body in an environment where there is no physical object on the floor;

manually tiling the vehicle body of the movable object to gradually increase the orientation angle for acquiring and associating the orientation angle with the distance until the floor is detected by the distance sensor; and recording an association result between the orientation angle with the distance.

9. The distance measurement method according to claim 6, wherein the measurement value acquired in when acquiring the measurement value in a detection range from a distance sensor is data indicating presence or absence of the physical object.

10. The distance measurement method according to claim 6, further comprising generating an object detection map based on the measurement value.

11. The distance measurement method according to claim 6, wherein, when invalidating the measurement value in an invalid range not included in the valid range of the detection range, the measurement value in a region where the invalid range is extended is invalidated.

12. A controller included in a movable object including a vehicle body, a distance sensor that measures a distance to a physical object on a floor, a tilt sensor that measures an orientation angle of the vehicle body, the controller being connected to the distance sensor and the tilt sensor, wherein the controller acquires a measurement value of a detection range from the distance sensor, generates an object detection map based on the measurement value acquired from the distance sensor, the object detection map including a first record, a second record, and a third record, the first record serving as an area where there is no physical object, the second record serving as an area where there is the physical object, the third record serving as an area where the presence or absence of the physical object is unknown, calculates a valid range of the detection range based on the orientation angle acquired from the tilt sensor, invalidates the measurement value in the invalid range that is not included in the valid range in the detection range by replacing the measurement value of the invalid range with the third record, postpones a determination of the presence or absence of the physical object in the invalid range, and after the vehicle body approaches the invalid range, acquires a measurement value of the invalid range from the distance sensor again, and determines the presence or absence of the physical object on the basis of the measurement value of the invalid range, wherein:
the valid range is defined as a range where the distance between the physical object and the vehicle body is measured by the distance sensor.

13. The controller according to claim 12, wherein the controller calculates the valid range based on a relationship between the orientation angle and a distance to a floor.

14. The controller according to claim 13, wherein the controller calculates the valid range based on a database that associates the orientation angle with the distance to the floor, and
wherein:
the database is acquired by:
installing a movable object having the vehicle body in an environment where there is no physical object on the floor;
manually tiling the vehicle body of the movable object to gradually increase the orientation angle for acquiring and associating the orientation angle with the distance until the floor is detected by the distance sensor; and
recording an association result between the orientation angle with the distance.

15. The controller according to claim 12, wherein the measurement value acquired from the distance sensor is data indicating presence or absence of the physical object.

16. The controller according to claim 12, wherein the controller generates an object detection map based on the measurement value.

17. The controller according to claim 12, wherein the controller invalidates the measurement value in a region where the invalid range is extended.

18. A non-transitory computer readable storage medium storing a program for causing a computer to execute the distance measurement method according to claim 6.

19. The movable object according to claim 1, wherein
the controller temporarily postpones the determination of the presence or absence of the physical object in the invalid range, and
a control flow of the controller is simplified by the postponement of the determination.

20. The movable object according to claim 1, wherein
after the vehicle body approaches the invalid range,
the controller re-acquires the measurement value of the invalid range from the distance sensor,
the controller determines the presence or absence of the physical object on the basis of the re-acquired measurement value, and
the invalid range is re-measured when the movable object approaches the area replaced with the third record.

* * * * *